Patented May 20, 1952

2,597,820

UNITED STATES PATENT OFFICE 2,597,820

PROCESS FOR OBTAINING COLORED COPIES OF CINEMATOGRAPHIC FILMS

Daniel Aragonés Puig, Barcelona, Spain

No Drawing. Application January 25, 1949, Serial No. 72,765. In Spain January 30, 1948

1 Claim. (Cl. 95—2)

The present invention relates to a process for obtaining coloured copies of cinematographic films.

In one of its particular aspects, the invention has reference to the realization of bicolour copies upon one unique gelatine or photographic emulsion of cinematographic films. Therefore, it is one of the advantages of the present invention that for obtaining a two-colour print, one may use the ordinary film used for obtaining copies in black and white, i. e., a normal positive unexposed film, for reasons of economy, although this preference does not exclude the possibility of carrying out the process with the use of the so called "duplicating," "fine grain," "lavender," "panchromatic negative," "negative for sound" films and others, all of which are, however, more expensive without giving any particular advantage over the use of the ordinary positive film sensitized on one side only. Economical reasons also make it advisable not to use films sensitized on both sides that are being used for some processes.

It will be readily understood that for obtaining coloured films in accordance with the process, object of the present invention, there have already been obtained, by means of the usual processes in the cinematographic industry, two negatives, one of which has registered the blue and green-blue parts of the images shot, and the other those corresponding to the red and orange parts.

When a photographically sensitized coating is exposed, its constitutive parts undergo an alteration which is deeper and more intense on the side of the light, owing to the fact that the action of the light diminishes progressively as it penetrates into the said coating, in such a way that, after having been normally exposed, its inner part still remains partially sensitive.

The process of the present invention, taking advantage of and increasing the said circumstance, has as a base the manipulating of the film in an appropriate manner in order to print one colour on a part of the depth of the emulsion from one of its faces or sides, without modifying the photographic sensitivity of the rest of the emulsion, and then to print on the latter the other colour.

The process of manipulating is as follows:

(a) The normal positive film is bathed in red light in a solution of about 3 per cent of tartrazine or similar product which dyes it yellow, the so treated film being then dried under red light or in darkness.

(b) Once the film is dry, it is exposed, preferably on the Celluloid side, in contact with the negative corresponding to the images of blue colour, passing the rays of the luminous focus used for this purpose, made parallel or not, through a filter of violet or blue colour or mixture of them, in order to assure that the exposure be made with light of a colour that may be strongly absorbed by the yellow tint, which, acting as a filter, opposes resistance to the penetration of the light into the interior of the coating of the emulsion. In this way, by increasing or reducing the proportion of the colouring applied in the mentioned step (a), one may increase or reduce, respectively, the resistance of the sensitive coating of the film to be exposed in depth. For the same purpose, other combinations of colours could be used, as, for example, colouring the emulsion red and printing with green light, etc., but these do not turn out so well as the former.

(c) The film is developed to the convenient intensity in a normal developer, and is then washed.

(d) The developed images are transformed blue by the conventional toning process, and, eventually (if it is thought necessary for the good progress of the process) the film is again coloured with tartrazine, and then dried in red light or in darkness.

(e) Afterwards the film is exposed on the side of the emulsion in contact with the negative corresponding to the images of the red-orange colour, and, if the film has been coloured in the step (d), a violet or blue filter is used in order to graduate the penetration of the light into the interior of the coating of the emulsion, as stated under (b).

(f) The film is developed in an appropriate bath.

(g) The film is fixed and washed.

(h) The silver image that forms the new printing is transformed in a metallic compound that serves as a mordant for certain aniline colours, particularly the so called basic colours, the film being dipper in a bath that changes the silver image into sulphocyanide of copper, or into ferrocyanide of copper, or into iodide of silver, etc., and it is then washed.

(i) The film is dipped into a colouring bath based on appropriate aniline colours to the tone and intensity that is desired to obtain for the red parts of the image.

(j) The film is washed until the absorbed colour be eliminated from the non mordanted gelatine, and is finally dried.

In order to avoid that the ferrocyanide of silver that has been formed together with the blue image should blacken during the operations following the formation of the said image, in some cases it may be convenient to dissolve or fix the said ferrocyanide between the steps (d) and (e) by means of a weak bath of sodium thiosulfate in an appropriate manner, so that the said bath should not affect the silver bromide still sensitive that the emulsion contains, and the film is then washed. In the same way, although this is not always necessary, it may be convenient to whiten the blue image at this juncture in a solution of sulphite of sodium.

The application of the process, object of this invention, presents the following advantages:

Owing to the fact that the two images are in the same coating of emulsion and, therefore, practically in the same plane, there is more precision in focusing the projection.

The emulsion of gelatine being more easily scratched than Celluloid and the film used having emulsion only on one side, this danger is considerably reduced.

The process does not require special machines or devices for treating one coating of emulsion without treating the other, nor does it require the application of protecting varnishes.

Greater facility of obtaining normal positive material and at a more economical price.

Greater facility for splicing the different parts of films, since for this purpose it is only necessary to scrape off the gelatine from one side.

And, finally, that for carrying out this process there may be used the same machines as are used normally in the cinematographic industry for black and white films, by the simple modification of the arrangement of the tanks and of some of the baths normally used.

In the carrying out of the process, there may be intercalated between its successive characteristic operations as many other steps of general or secondary character, such as washings, dryings and others as may be desired.

What I claim is:

A method of obtaining two colour copies in one layer of a silver halide emulsion performed on film, comprising treating the film with tartrazine, printing the blue recording negative on one face of said layer, developing the printed first image, iron toning the same with ferricyanid bath, treating firstly with aqueous sodium thiosulphate of such strength that it will fix the silver ferrocyanide without affecting the silver halide, treating secondly with sodium sulphite, treating for a second time the film with tartrazine, printing the red recording negative on the other face of said layer, developing the printed second image, fixing said image, treating said fixed image with a mordant, and coloring the same.

DANIEL ARAGONÉS PUIG.

REFERENCES CITED

The following references are of record in the file of this patent:

UNITED STATES PATENTS

| Number | Name | Date |
|--------|------|------|
| 1,674,174 | Kelley et al. | June 19, 1928 |
| 1,848,714 | Harris | Mar. 8, 1932 |
| 1,976,301 | Seymour et al. | Oct. 9, 1934 |
| 2,226,339 | Crespinel | Dec. 24, 1940 |

FOREIGN PATENTS

| Number | Country | Date |
|--------|---------|------|
| 532,870 | Great Britain | Feb. 3, 1941 |